March 25, 1947. A. A. SCHILD 2,418,049
TRIMMER
Filed May 18, 1945 2 Sheets-Sheet 1
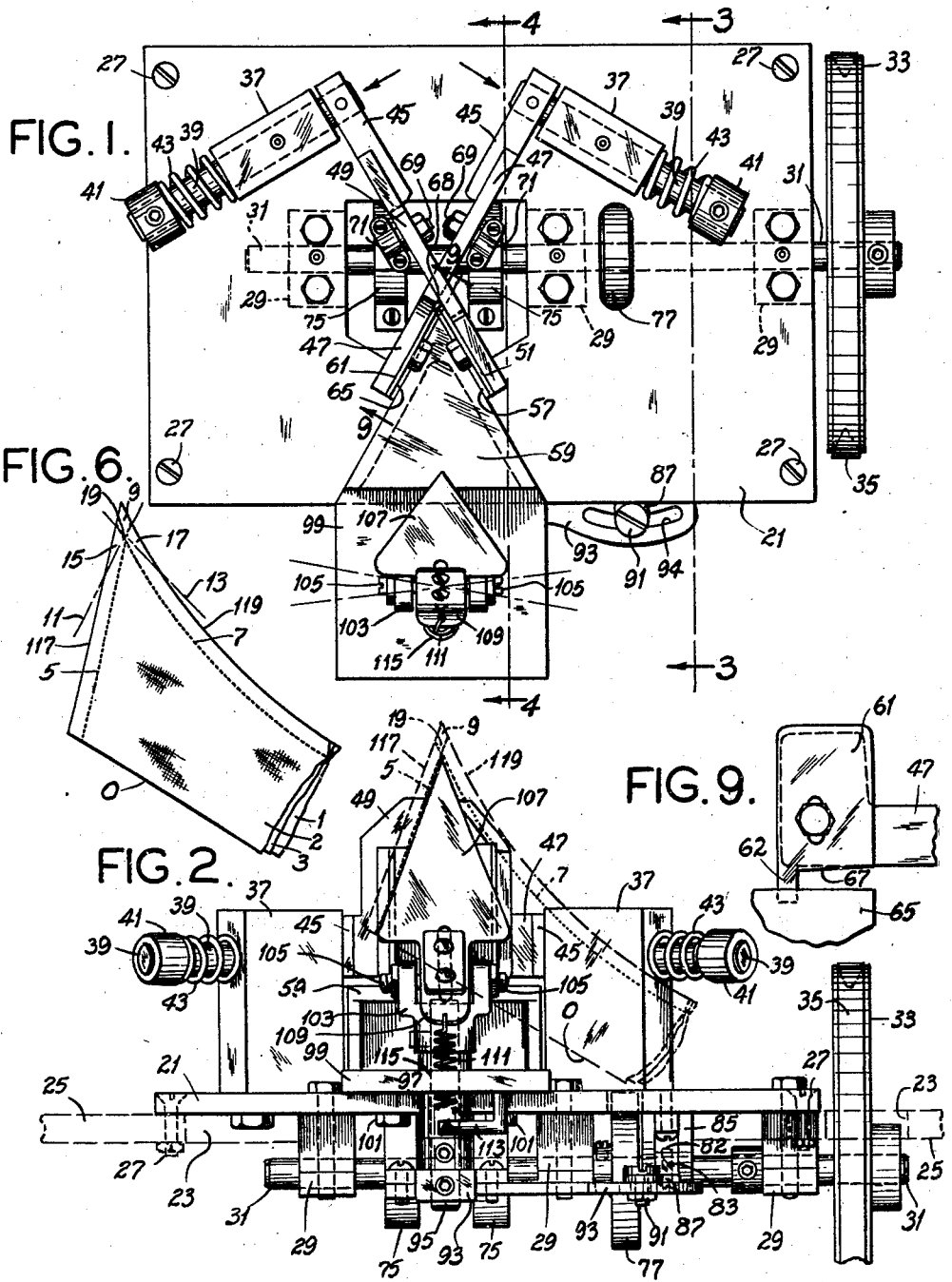
Arthur A. Schield,
Inventor.
Haynes and Koenig
Attorneys.

March 25, 1947.   A. A. SCHILD   2,418,049
TRIMMER
Filed May 18, 1945   2 Sheets-Sheet 2
FIG. 3.
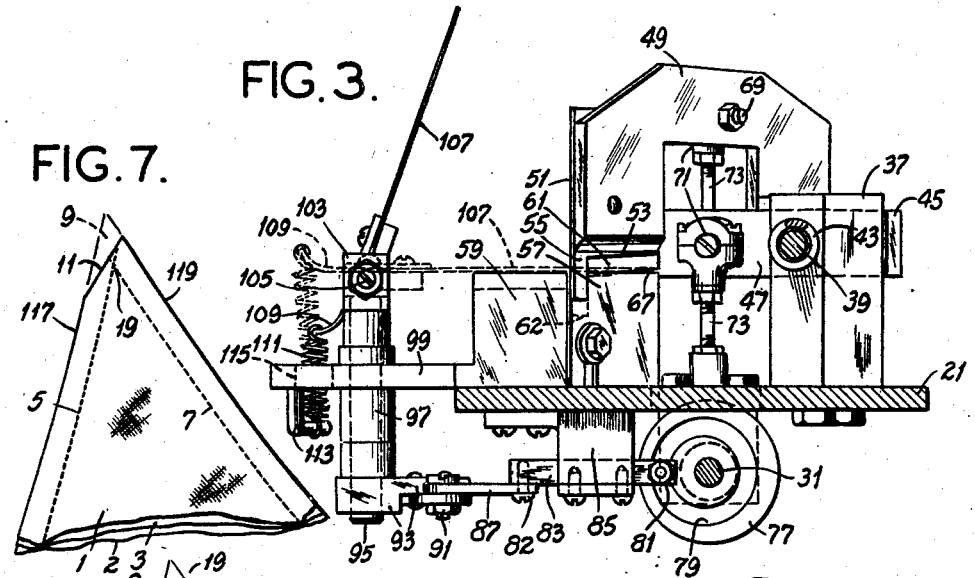
FIG. 7.
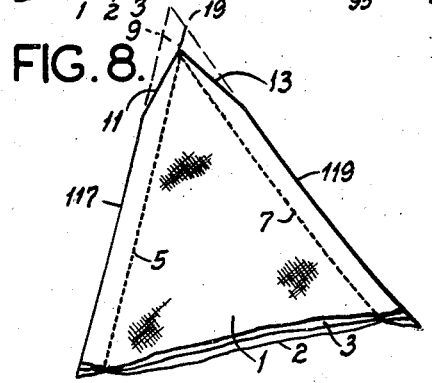
FIG. 8.
FIG. 5.
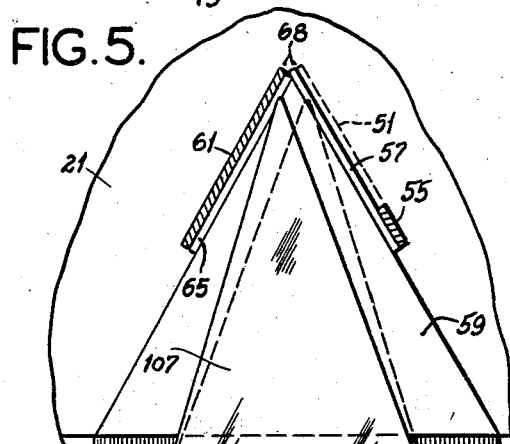
FIG. 4.
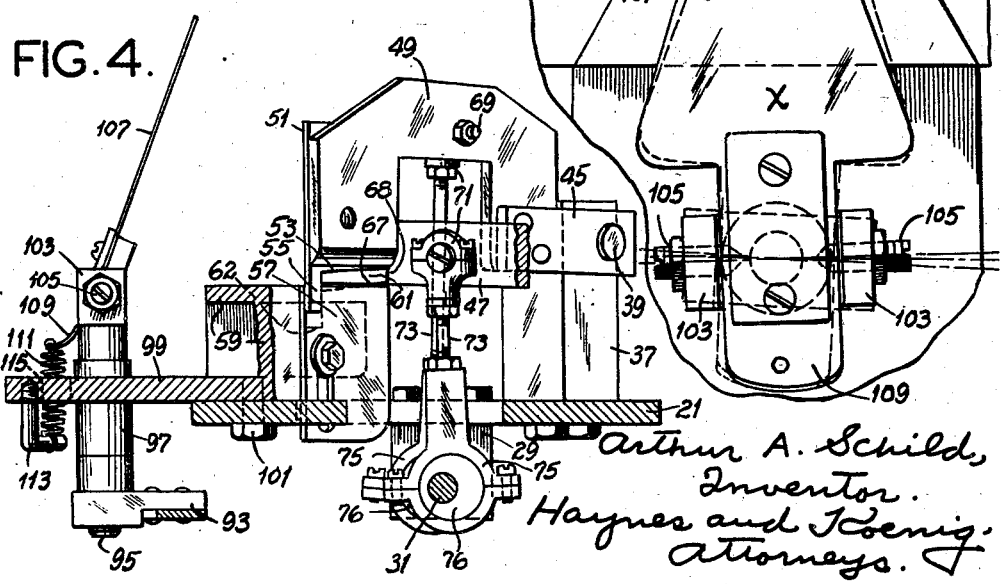
Arthur A. Schild,
Inventor.
Haynes and Koenig.
Attorneys.

UNITED STATES PATENT OFFICE 2,418,049

TRIMMER

Arthur A. Schild, Farmington, Mo.

Application May 18, 1945, Serial No. 594,553

9 Claims. (Cl. 164—41)

This invention relates to trimmers, and with regard to certain more specific features to a trimmer for removing tips from shirt collars and the like.

Among the several objects of the invention may be noted the provision of a trimmer for effectively removing tipped portions of inside-out shirt collars so that when said collars are reversed no inside tip portions remain to make unsightly bulges; the provision of a trimmer for effecting removal of as much as possible of the tips without cutting into the stitching of adjacent crossing seams; the provision of apparatus of the class described which may be operated safely at high speeds to produce a high output of a superior collar product; and the provision of apparatus of this class which is simple to construct, maintain and operate. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a top plan view of the trimmer;

Fig. 2 is a front elevation of Fig. 1;

Fig. 3 is a vertical section taken on line 3—3 of Fig. 1;

Fig. 4 is a vertical section taken on line 4—4 of Fig. 1;

Fig. 5 is a detailed plan view of a guide tongue in an operating position, and showing in dotted-lines another operating position thereof;

Fig. 6 is a plan view of one corner of an inside-out collar showing by means of dashed crossed lines the cuts effected by the apparatus for removing the objectionable tip portions at a seam intersection;

Fig. 7 is an enlarged fragmentary view of a part of Fig. 6 showing an initial cut;

Fig. 8 is a view similar to Fig. 7 showing a final cut; and,

Fig. 9 is a detail section taken on line 9—9 of Fig. 1.

Similar reference characters indicate corresponding parts throughout the several views of the drawings.

Collars for shirts are, prior to application to the collar bands of the shirts, made inside-out. Each is composed of two or more strips of cloth which are edge-seamed. For example, as shown in Fig. 6, there are layers 1, 2 and 3 edge-seamed by stitching 5 and 7 crossing at 19. Fig. 6 shows only one end of the collar but the other end is similar. Ultimately the assembly of layers 1, 2, 3 is turned inside-out with the layers 1 and 3 on opposite sides of the layer 2, the latter acting as an interliner. It should be understood that the invention is also applicable to collars made of other numbers of layers, for example two layers.

In any event, the problem is to remove from the inside-out collars as shown, the tip portion 9. This, if not removed, forms a lump inside of the collar tip when the collar is reversed preparatory to application to a collar band. Cuts taken along the lines 11 and 13 shown in Fig. 6 are suitable for the purpose of removing this tip and some additional portions 15 and 17 as shown. The effect of the removal is shown in Fig. 8. It is desired to effect removal of the tip as closely as possible to the point 19 where the seams 5 and 7 cross, without cutting the seams inside of point 19.

In prior apparatus the cuts that were taken on lines 11 and 13 were effected by reciprocating cutters which acted upon the collar while the latter was held stationary during the cutting operation. This had the disadvantage that the ends of the knives, although working in close proximity to one another at the point 19 where the lines 11 and 13 cross, could not be made long enough to cross at this point because then they would operatively interfere. Hence there were usually left shreds of material at the point 19 which needed to be separated by hand pulling and which left some material at this point inside of the reversed collar. Only the finest adjustments of the machine could avoid or minimize these and such adjustments could not long be maintained without constant attention, particularly under high speed operation. For examples of prior-art apparatus of this nature see U. S. Patents 1,965,968; 2,242,665; and 2,259,351. The present invention provides a definite and clean cut crossing of the lines of cutter action whereby an exceedingly clean cut point 19 may be produced quite close to the seam intersection as shown in Fig. 8.

Referring now more particularly to Fig. 1, there is shown at numeral 21 a supporting plate which, as shown in Fig. 2 may be bolted above an opening 23 in a work bench 25. The bolts are shown at 27. Depending from this plate 21 are three bearings 29 for a drive shaft 31. This shaft carries a pulley 33 driven by a belt drive 35 from a suitable motor (not shown).

On top of the plate 21 are two bearing blocks 37 for knife shafts 39. Shafts 39 have end collars 41 between which and the blocks 37 are compression springs 43. These springs 43 resiliently bias the shafts 39 in the directions of the arrows along the axes of the shaft (Fig. 1).

The ends of the shafts 39, opposite the collar 41, have pinned thereto arms 45. One of the arms 45 carries a straight extension 47 (see also Figs. 3, 4 and 9). The other arm 45 carries a goosenecked extension 49 (see Figs. 3 and 4). Extensions 47 and 49 oscillate in vertical planes in opposite directions, the goosenecked form of the extension 49 accommodating therebeneath the oscillating motion of the extension 47.

The goosenecked extension 49 has bolted to its forward end a blade 51 which has an offset cutting edge 53 and an extending tongue 55. This tongue is biased toward and engages a cutter plate 57. Plate 57 is attached to one side of a triangular cutting table or blade 59. The bias is provided by the left-hand spring 43 (Fig. 1). The upper edge of the cutter plate 57 is sharpened and is tangently engaged by the cutting edge 53 of the knife 51. The tongue 55 has a sliding action against the face of the plate 57.

The front end of the straight extension 47 is also provided with a similar blade 61 (Fig. 9) which has an extending tongue 62 engaging a cutter plate 65 bolted to the other side of the triangular table 59. The blade 61 also has a lower cutting edge 67 which engages the upper sharpened edge of the plate 65. Bias of tongue 62 against plate 65 is caused by the right-hand spring (Fig. 1). In their vertical reciprocations, the inner portions 61 and 51 of the knives at corner 68 must not cross one another, this lack of crossing being indicated in Fig. 5. It is for a lack of the present construction that former structures of this type failed to perform in an entirely satisfactory manner.

The arms 45 along with their extensions 47 and 49 are given opposite oscillations in the vertical plane by the following construction. Each extension 47 and 49 has a ball joint 71 attached by means of a stud 69. Connecting rods 73 extend downward from these ball joints to eccentric straps 75 located around eccentrics 76. The eccentrics are carried on and driven by the shaft 31 and are angularly phased at 180°. Thus turning of the shaft 31 will result in vertical oscillations of the extensions 47 and 49 and hence in vertical oscillations of the blades 61 and 51. The knife blades exert cutting actions with respect to the plates 57 and 65. The stated phasing causes one knife blade to be cutting while the other is retracting and vice versa.

The shaft 31 also drives a positive-motion cam 77 in which is a side groove 79 driving a roller follower 81 located upon a reciprocating block 83. The block 83 is supported in a bearing 85 attached below the plate 21. A connected rod 87 extends from a pivot 82 on the slide 83 to a pivot 91 on an arm 93. The pivot 91 is adjustably located in a slot 94 on arm 93. The arm 93 is attached to a vertical post 95 carried in a vertical bearing 97. The bearing 97 forms part of an extension arm 99 from work table 59, the table and extension being bolted to the plate 21 as shown at 101. At its upper end the post 95 has attached thereto a clevis 103 to which is pivoted (by means of the adjustable pivots 105) a triangular holder platen 107. Platen 107 has a tail end 109 which is biased downward by means of a spring 111, the latter reacting from a fixed finger 113 extending downward from the extension 99. A suitable opening 115 in the extension 99 accommodates the spring 111. The platen 107 is shown by solid lines in its upwardly biased position in Fig. 3. It may be pushed down manually to the dotted-line position in said Fig. 3, against the bias of the spring 111. In its downward position it rests flat upon the triangular guide table 59 (see also Fig. 5). In this position the platen 107 may oscillate from the solid-line position to the dotted-line position shown in Fig. 5. This occurs as the clevis 103 oscillates under action of the cam 77, follower 81, slide 83, connecting rod 87, arm 93 and vertical post 95.

Operation is as follows, assuming that the driving motor is operating and the shaft 31 turning. The eccentrics 76, through the connecting rods 73 drive the extensions 47 and 49, thus vertically oscillating the blades 51 and 61 relative to the cutting plates 57 and 65. The oscillations are in opposite directions so that cutting strokes are effected alternately on opposite sides of the cutting table 59. Normally the platen 107 is in its upwardly extending position shown in Figs. 1, 2, 3 and 4. In this position it is oscillating slightly out of its plane but not enough to make it difficult to perform the following operations:

The operator picks up an inside-out collar which is opened on one edge O and applies it to the guide platen 107 as shown in Fig. 2. The triangular or pointed shape of the platen fits the triangular inside part of the adjacent end of the collar as indicated. Then the operator simply presses down the platen from the solid-line position shown in Figs. 1, 2, 3 and 4 to the dotted-line position shown in Fig. 3. The platen is all the while oscillating back and forth and finally moves between the two positions on the cutting table 59 as shown in Fig. 5. It is to be understood that in Fig. 5 for clarity the end of the collar is not shown in position on the platen 107. In any event when the platen oscillates to the solid-line position at the left in Fig. 5, the adjacent edge of the collar is pushed over the corresponding knife plate 65. It approaches as the corresponding knife 61 descends. The platen 107 reaches its maximum leftward solid-line position as the knife 61 cuts, thus effecting a first cut on line 11 (Fig. 7). This brings both edges 117 and 119 of the collar entirely under the knife 61 so that the cut is made across both of these edges. Then as the knife 61 recedes, the tongue oscillates over to the dotted-line position as shown in Fig. 5. At the start of the traverse the knife blade 51 is raised. When the dotted-line position of platen 107 is reached the knife blade 51 descends and makes the second cut on line 13 (Fig. 8). Again, the cut is across both edges of the collar. Thus both edges of the collar are completely and cleanly traversed by the cuts. This is due to the angular movement of the collar tip between cuts. Since the device runs at a substantially high speed, for example 350 R. P. M., the operator needs only to tilt the platen 107 downwardly for an instant during which a complete oscillating cycle and both trimming cuts are accomplished. He then releases the platen 107 whereupon it springs up to the solid-line position shown in Figs. 1, 2, 3 and 4, after which the collar may be shifted so that its other corner (not shown) is applied to the pointed end of the platen without removing the collar from the platen. The platen is then again depressed and the operation repeated. These operations may be repeated very quickly on collar after collar. A large output is assured without loss of time heretofore required to pull loose fringes.

By reason of the oscillating action of the platen 107 between the knives, clean cut, fringeless edges are assured as indicated in Figs. 7 and 8. Also, the machine is safe, since the operator applies the collar over the platen in its raised position and can push the platen down by pressure at its rear portion indicated at X in Fig. 5. If a finger should inadvertently move forward on the platen while it is down the extensions 55—62 function as partial obstructions to inhibit it from getting into the cutters proper. For additional safety a guard ridge could be used in front of "X" (Fig. 5).

The angle of oscillation of the platen 107 may be adjusted by adjusting the position of the pivot 91 in the arcuate slot 95. The closer that the pivot 91 is toward the oscillating post 95, the larger the angle of oscillation. The adjustment should be such that the cutting lines 11 and 13 come as close as possible to the intersection 19 without entering it (see Figs. 7 and 8).

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A trimmer comprising a blade having angular cutting edges, operating knives cooperating with said edges and adapted to perform alternating cutting operations, a tapered piece-holding platen, and means for oscillating the platen substantially in the plane of the platen for bringing first one side of a piece on the platen under one knife and then the other side of the piece underneath the other knife, whereby the cuts executed on the piece by the knives are positively intersecting.

2. A trimmer comprising a substantially flat work table having angular cutting edges, operating knives cooperating with said edges to perform cutting operations, a normally upright tapered collar-holding platen adapted to be depressed into substantially flat contact with said cutting table, and means for oscillating the platen across the face of the table when depressed substantially in the plane of the platen for bringing first one side of a collar under one knife and then the other side of the collar underneath the other knife, whereby the cuts executed on the collar by the knives are positively intersecting.

3. A trimmer comprising a substantially flat work table having angular cutting edges, operating knives cooperating with said edges to perform cutting operations, a normally upright tapered collar-holding platen adapted to be depressed into substantially flat contact with said cutting table, means for oscillating the platen across the face of the table when depressed substantially in the plane of the platen for bringing first one side of a collar under one knife and then the other side of the collar underneath the other knife, whereby the cuts executed on the collar by the knives are positively intersecting, and means for adjusting the degree of oscillation of the platen.

4. A trimmer comprising a work table having angular cutting edges, alternately and oppositely reciprocating knives cooperating with said edges to perform cutting operations, a tapering collar-holding platen adapted to be brought into substantially flat contact with said cutting table, positive-drive means for oscillating the platen across the face of the table substantially in the plane of the platen for bringing first one side of a collar under one knife and then the other side of the collar underneath the other knife, whereby the cuts executed on the collar by the knives are positively intersecting, and means for adjusting the degree of oscillation of the platen.

5. A trimmer comprising a blade having angular cutting edges, alternately operating knives cooperating with said edges and adapted to perform alternate single cutting operations, a tapered collar-holding platen, and means for swinging the platen across the face of the table once for each knife cut for bringing first one side of a collar under one cutting knife and then the other side of the collar underneath the other cutting knife, whereby the single cuts executed on the collar by the respective knives are positively intersecting.

6. A trimmer comprising angled cutting knives the respective cutting edges of which do not cross, said cutting edges being located at an angle, a working surface located between the angular cutting edges, a vertical post, means for oscillating said post to a limited extent, a platen pivoted to said post on a substantially horizontal axis and oscillating therewith, said platen being movable on its horizontal axis from an upward position to a substantially flat position on said working table, means for biasing said platen upward, said platen being of tapering form and adapted to receive a tapered pocket-like member to be cut, whereby upon application of said member to the platen and pressing of the latter against said work table, the edges of said pocket-like member are oscillated successively into opposite ones of said cutting knives in such a manner that the cut edges of said pocket-like member positively intersect.

7. A trimmer comprising angled cutting knives the respective cutting edges of which do not cross, said cutting edges being located at an angle, a substantially horizontal working surface located between the angular cutting edges, a vertical post near said surface, means for oscillating said post to a limited extent, a platen pivoted to said post on a horizontal axis and oscillating on said axis, said platen while oscillating being manually movable on its horizontal axis from an upward position to a substantially flat position on said working table, means for biasing said platen upward, said platen being of tapering form and adapted to receive a tapered pocket-like member to be cut, whereby upon application of said member to the platen and pressing of the latter against the bias on the said work table, edges of said member are oscillated successively under opposite ones of said cutting knives in such a manner that the cut edges of said member positively intersect, and adjustable means for oscillating said post to any one of various angles.

8. A trimmer comprising a blade having coplanar angularly related cutting edges, oscillating knives cooperating with said edges, said knives being adapted to perform alternating cutting operations in conjunction with said edges, a tapered platen adapted to receive a tapered pocket-like piece which is to be trimmed, an oscillating post, said platen being horizontally pivoted on said post and normally biased upward for receiving said piece and being adapted to be pushed downward while oscillating, means limiting the downward position of the platen while oscillating so that the platen oscillates in its own plane perpendicular to the planes of the knives, the length of the platen being such that the tapered end of the pocket-like piece is pushed first under one knife and then the other, whereby positively crossed cuts are brought about upon said piece.

9. A trimmer comprising a blade having coplanar angularly related cutting edges, oscillating knives cooperating with said edges, crossed oscillating arms supporting said knives, said knives being adapted to perform alternating cutting operations in conjunction with said edges without crossing one another, a pointed platen adapted to receive a pointed pocket-like piece which is to be trimmed across the point, an oscillating post, said platen being horizontally pivoted on said post and normally biased upward for receiving said piece and being adapted to be pushed downward while oscillating, means limiting the downward position of the platen while oscillating so that the platen oscillates in its own plane perpendicular to the planes of the knives, the length of the platen being such that the point of the pocket-like piece is pushed first under one knife between its ends and then the other knife between its ends whereby crossed cuts are brought about upon said piece positively to remove its point.

ARTHUR A. SCHILD.

REFERENCES CITED

The following references are of record in the file of this patent:

UNITED STATES PATENTS

| Number | Name | Date |
|---|---|---|
| 2,031,545 | Moulton | Feb. 18, 1936 |
| 1,962,024 | Mann | June 5, 1934 |